(12) United States Patent
Coile et al.

(10) Patent No.: US 8,639,976 B2
(45) Date of Patent: Jan. 28, 2014

(54) POWER FAILURE MANAGEMENT IN COMPONENTS OF STORAGE AREA NETWORK

(75) Inventors: Brantley Coile, Athens, GA (US); Alan Beltran, San Clemente, CA (US); Robert Przykuki, Redwood City, CA (US)

(73) Assignee: Coraid, Inc., Redwood City, CA (US)

( * ) Notice: Subject to any disclaimer, the term of this patent is extended or adjusted under 35 U.S.C. 154(b) by 429 days.

(21) Appl. No.: 13/028,075

(22) Filed: Feb. 15, 2011

(65) Prior Publication Data

US 2012/0210169 A1 Aug. 16, 2012

(51) Int. Cl.
*G06F 11/00* (2006.01)
(52) U.S. Cl.
USPC .......................................................... 714/22
(58) Field of Classification Search
USPC .......... 714/4.1, 4.11, 4.12, 4.3, 4.4, 4.5, 6.13, 714/6.2, 6.21, 6.22, 6.23, 6.3, 6.31, 25–28, 714/39
See application file for complete search history.

(56) References Cited

U.S. PATENT DOCUMENTS

| | | | |
|---|---|---|---|
| 5,842,030 A * | 11/1998 | Larabell et al. | 713/340 |
| 6,990,603 B2 * | 1/2006 | Strasser | 714/6.2 |
| 7,028,154 B2 * | 4/2006 | Reeves | 711/162 |
| 8,392,756 B2 * | 3/2013 | Nakayama et al. | 714/14 |
| 2005/0273650 A1 * | 12/2005 | Tsou | 714/6 |
| 2006/0106893 A1 * | 5/2006 | Daniels et al. | 707/204 |
| 2007/0192582 A1 * | 8/2007 | Agan et al. | 713/2 |
| 2010/0295513 A1 | 11/2010 | McCollum et al. | |
| 2012/0151262 A1 * | 6/2012 | Nakayama et al. | 714/22 |

FOREIGN PATENT DOCUMENTS

WO WO 2010/049929 A1 5/2010
WO WO 2010/129179 A2 11/2010

OTHER PUBLICATIONS

PCT International Search Report and Written Opinion, PCT Application No. PCT/US2012/023537, May 14, 2012, 16 pages.
Hopkins, S., et al., "AoE (ATA over Ethernet)," The Brantley Coile Company, Inc., Feb. 2009, pp. 1-12.

* cited by examiner

*Primary Examiner* — Nadeem Iqbal
(74) *Attorney, Agent, or Firm* — Fenwick & West LLP

(57) ABSTRACT

A storage area network (SAN) is provided with redundancy and recovery mechanism. A primary storage switch performs dynamic address translation between logical storage addresses received from host devices and physical addresses of SAN storage arrays. When power failure in the primary storage switch is detected, metadata associated with the dynamic address translation operation is sent to a secondary storage switch via a network connection to provide the dynamic address translation in lieu of the primary storage switch. A storage array experiencing power failure similarly sends cached data to another storage array via a network connection so that the other storage array can substitute the failed storage array. During the power failure, a data backup module in the primary storage switch or the storage array is powered by a temporary power source.

28 Claims, 6 Drawing Sheets

POWER FAILURE MANAGEMENT IN COMPONENTS OF STORAGE AREA NETWORK

BACKGROUND OF THE INVENTION

1. Field of the Invention

The present invention relates to providing temporary power to a storage switch or storage device and backing up operational data during failure of a primary power source.

2. Description of the Related Art

Storage Area Network (SAN) enables one or more storage devices remote from a host device to appear as if the storage devices are locally attached to the host device. Conventionally, the SAN was implemented using protocols such as iSCSI or Fiber Channel over Ethernet (FCoE) between host devices and the storage devices. Specifically, commands under Small Computer System Interface (SCSI) were reformatted into iSCSI or FCoE for transmission via Transmission Control Protocol/Internet Protocol (TCP/IP). However, the SCSI command is not designed specifically for storage devices. Hence, the SCSI commands tend to have a large amount of overhead because of the complexity of the SCSI protocol. Reformatting the SCSI commands for transmission using TCP/IP protocol adds additional overhead, rendering operations associated with the SAN inefficient.

AT Attachment over Ethernet (AoE) was developed to overcome such deficiency. The AoE is a non-connection based protocol that allows implementation of Storage Area Network (SAN) using storage devices compliant with Serial Advanced Technology Attachment (SATA) specification. SATA compliant storage devices are generally cheaper than SCSI compliant storage devices. By using SATA compliant devices, the AoE protocol enables cheaper implementation of the SAN compared to using the combination of iSCSI or FCoE and SCSI compliant storage devices. Moreover, the AoE protocol removes overhead associated with connection-based protocol such as TCP/IP, which renders data transmission more efficient.

A host device requests writing or reading of data using logical addresses. However, the storage devices are accessed using physical addresses. Hence, the SAN generally uses a storage switch that provides translation between logical addresses and physical addresses of data. The storage switch provides dynamic address translation of such logical addresses to physical addresses of the storage devices or vice versa to enable the host device to access the data. For this purpose, the storage switch stores a dynamic address translation table mapping the relationships between the logical addresses and physical addresses. The storage switch can also include other metadata such as information indicating the part of the storage device available to store new data.

If the dynamic address translation table or other metadata becomes unavailable, the host device cannot write or read data in the SAN because the physical addresses of the data cannot be determined from the logical addresses (as identified by the host device) and the locations on the storage devices available for write operations cannot be verified. Hence, a backup and restoration mechanism should be provided for the dynamic address translation table and other metadata in the storage switch so a backup storage switch can resume operation in case a primary storage switch becomes inoperable.

Also, the storage devices in the SAN may employ a write cache memory for temporarily storing data before the data are written to non-volatile memory devices (e.g., hard disks). The cache memory advantageously buffers incoming data and allows the storage devices to receive the data at a higher speed than the speed at which the data can be written to the non-volatile memory devices.

The write cache memory in the storage devices is generally implemented as a high-speed volatile memory. Hence, if power to the write cache memory fails before the cached data are written to the non-volatile memory devices, the cached data may be lost. The lost data in the write cache memory may cause discrepancy in the data actually stored in the storage devices and the data that are recorded in the host device as being stored in the storage devices. Such discrepancy may cause error in operations at the host device. Hence, a backup and restoration mechanism should be provided for the write cache memory in case the storage devices experience power failure.

SUMMARY OF THE INVENTION

Embodiments of the present invention provide a storage switch for managing access of a host device to at least one storage device over a network where the storage switch sends mapping information for performing dynamic address translation to another storage switch when failure of power is detected in the storage switch. During the power failure of the storage switch, a data backup module in the storage switch is powered by a temporary power source to send the mapping information to the other storage switch. After receiving the mapping information, the other storage switch can perform dynamic address translation in place of the inoperable storage switch based on the received mapping information.

In one embodiment, a storage device operating with the storage switch performs read or write operations for the host device and also sends cached write data of a non-volatile storage module experiencing power failure to another storage device. The non-volatile storage module experiencing power failure may be removed from the storage device and installed in the other storage device. The other storage device can resume operations of the installed non-volatile storage module without losing any cached data for the non-volatile storage module.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

Figure 1:
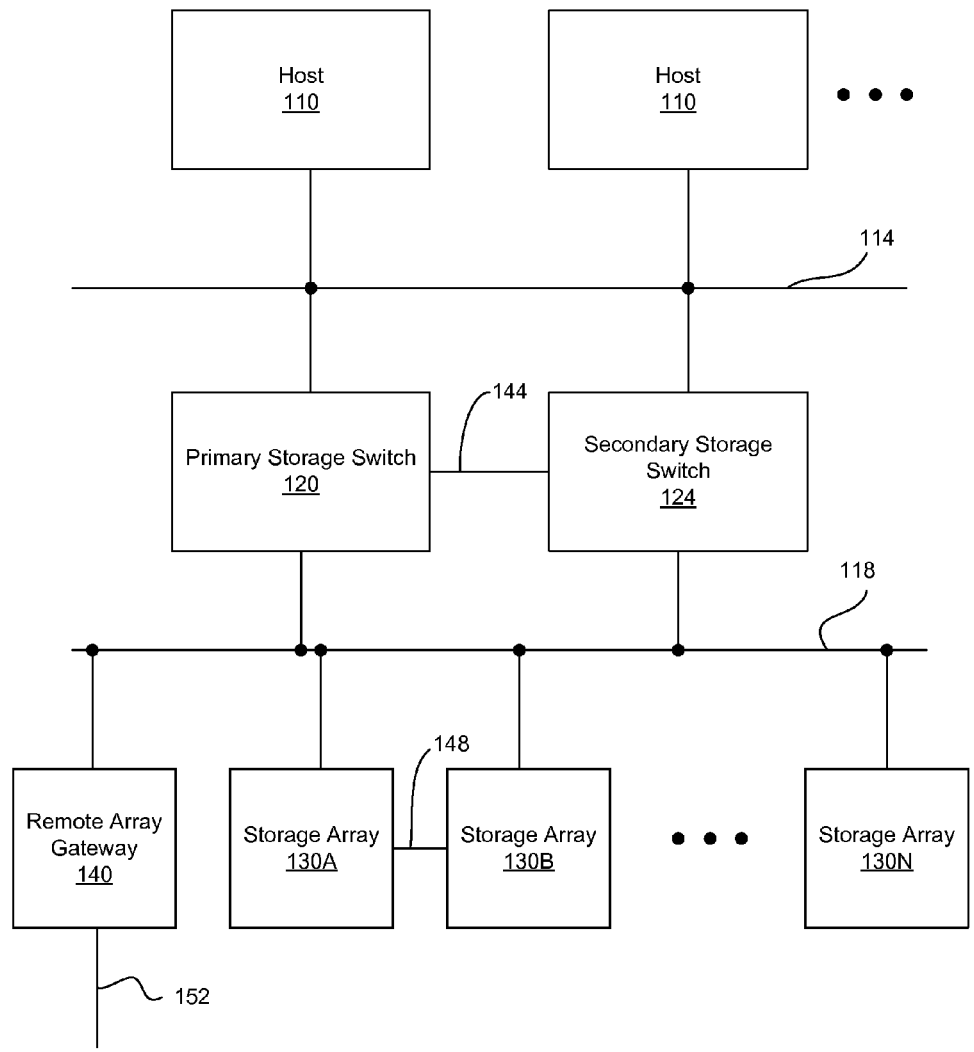
FIG. 1 is a conceptual diagram illustrating a system embodying a storage area network (SAN), according to one embodiment.

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only.

Embodiments relate to providing redundancy and recovery mechanism for components of a storage area network (SAN). A primary storage switch performs dynamic address translation between logical storage addresses received from host devices and physical addresses of SAN storage arrays. When power failure in the primary storage switch is detected, metadata associated with the dynamic address translation operation is sent to a secondary storage switch so that the secondary storage switch can perform the dynamic address translation in lieu of the primary storage switch. A storage array having some or entire non-volatile storage modules experiencing power failure similarly sends cached write data to a backup storage array so that the backup storage array can replace operations of the failed storage array by moving the non-volatile storage modules experiencing the power failure from the failed storage array to the backup storage array. A data backup module in the primary storage switch or the storage array for sending the metadata or the cached write data is powered by a temporary power source when the primary storage switch or the storage device experiences power failure.

Mapping information described herein refers to information that indicates relationships between logical addresses and physical addresses of data. The mapping information is embodied, for example, as a dynamic address translation table.

Metadata described herein refers to information for performing data read or write operation. The metadata may include, among others, the mapping information, information indicating locations of storage devices available for write operations and information indicating change of storage areas since a previous time point.

A logical address described herein refers to information used by a host device to indicate the locations of data. Host operating systems view the storage devices as a single contiguous series of data blocks, each identified by a logical block address or number. The actual data may be storage on non-contiguous and all the blocks may not be on the same physical device.

A physical address described herein refers to information indicating the physical location of data in a storage device. The physical address may indicate, for example, the identity of the storage array, a drive unit in the storage array, and the logical block number.

Overall Architecture of Storage Area Network System

Figure (FIG. 1 is a conceptual diagram illustrating a system embodying a storage area network (SAN), according to one embodiment. The SAN system may include, among other components, hosts 110, primary storage switch 120, secondary storage switch 124 and multiple storage arrays 130A through 130N (hereinafter collectively referred to as "the storage arrays 130"). The hosts 110 access the storage arrays 130 and remote array gateway 140 via the primary storage switch 120 during normal operations (e.g., when there is no power failure). The hosts 110 access the storage arrays 130 and the remote array gateway 140 via the secondary storage switch 124 when the primary storage switch 120 is not operational (e.g., when there is power failure).

The primary storage switch 120 and the secondary storage switch 124 communicate with the hosts 110 via network 114. The primary storage switch 120 and the secondary storage switch 124 also communicate with the storage array 130 and remote array gateway 140 via network 118. Although illustrated as separate networks, the network 114 and the network 118 can be interconnected. The architecture or topology of FIG. 1 is merely illustrative. Embodiments may be applicable to various other network topologies or SAN architecture.

The hosts 110 are computing devices for performing various computing operations. The hosts 110 may include a server, a desktop computer, a laptop computer, a tablet computer, a handheld computing device (e.g., smartphone), a set-top box, a gaming console and a media player (e.g., DVD player or network supported TV). In one embodiment, each of the hosts 110 includes host bus adapters (HBAs) and related software programs that allow the hosts 110 to communicate with the storage arrays 130 via the primary storage switch 120 or the secondary storage switch 124 in a transparent manner. That is, the HBAs and related software programs enable the hosts 110 to simulate reading and writing operations as if the storage arrays 130 are locally connected to the hosts 110.

In one embodiment, the HBA is EtherDrive SAN HBA Dual 10-Gigabite Ethernet PCI-E or EtherDrive SAN HBA 2-Gigabit PCI-E available from Coraid Inc. of Redwood City, Calif. These HBAs are mounted onto Peripheral Component Interconnect Express (PCI-E) slots in the hosts 110.

The primary storage switch 120 performs dynamic address translation of data addresses to enable the hosts 110 to access the storage array 130. In one embodiment, the hosts 110 communicate with the primary storage switch 120 via the network 114 using an ATA over Ethernet (AoE) protocol, as described in S. Hopkins et al., "AoE (ATA over Ethernet)," The Brantley Coile Company, Inc. (February 2009), which is incorporated by reference herein in its entirety. The use of AoE protocol is advantageous, among other reasons, because overhead associated with read or write operations via the network can be reduced compared to other protocols. However, the communication between the hosts 110 and the primary storage switch 120 is not limited to AoE protocol. In other embodiments, communication protocols such as iSCSI or Fiber Channel over Ethernet (FCoE) protocol are used to communicate between the hosts 110 and the primary storage switch 120.

The dynamic address translation refers to the process of converting logical addresses to physical addresses or vice versa. The hosts 110 manage reading or writing of data using logical data addresses. Conversely, data in the storage arrays 130 allow access to their data using physical data addresses. Therefore, the primary storage switch 120 converts logical addresses in requests received from the hosts 110 to physical data addresses for accessing the storage array 130, as described below in detail with reference to FIG. 2.

The secondary storage switch 124 is substantially identical to the primary storage switch 120 except that the secondary storage switch 124 is operated when the primary storage switch 120 becomes inoperable (e.g., when there is power failure). The primary storage switch 120 and secondary storage switch 124 are connected via channel 144 to communicate mapping information associated with the dynamic translation operation.

In one embodiment, the secondary storage switch 124 is periodically or intermittently updated with the metadata from the primary storage switch 120. When the power failure is detected in the primary storage switch 120, a backup module in the primary storage switch 120 is powered by a temporary power source. The backup module then sends any incremental changes in the metadata since the previous update of the metadata to the secondary storage switch 124 via the channel 144 to replicate the metadata in the primary storage switch 120. Although only one redundant storage switch (i.e., the secondary storage switch 124) is illustrated in FIG. 1, two or more additional storage switches may be provided for additional redundancy. In such case, the storage switches may be connected to the primary storage switch 120 to receive the metadata from the primary storage switch 120.

The storage array 130 includes an array of non-volatile storage units such as hard disks for storing data associated with one or more host 110. The storage arrays 130 are connected via channel 148 to communicate cached write data from one storage array (e.g., storage array 130A) with power failure to another storage array (e.g., storage array 130B) for performing backup operations, as described below in detail with reference to FIG. 4. Specifically, each of the storage arrays 130 is connected to another storage array or multiple storage arrays to backup data in write cache or other metadata in case at least one of its non-volatile storage units experiences power failure. In one embodiment, the storage arrays 130 are EtherDrive SRX Series devices or EtherDrive SR Series devices from Coraid Inc. of Redwood City, Calif.

The storage arrays 130 communicate with the primary storage switch 120 or the secondary storage switch 124 via the network 118 using for example, AoE. Protocols other than AoE may also be used to store metadata in the secondary storage switch 124.

The remote array gateway 140 is connected to one or more storage arrays (not shown) in a different cluster of storage arrays or storage arrays in a different area. Specifically, the remote array gateway 140 is connected to a network (not shown) that is in turn connected to the one or more clusters of storage arrays. The remote array gateway 140 receives and responds to requests from the primary storage switch 120 or the secondary storage switch 124 to write data to or read data from the clusters of storage arrays in the different cluster or different area.

In one embodiment, the channels 144, 148 are implemented separate from the networks 114, 118. In this way, the channels 144, 148 are not affected by any congestion or other issues in the networks 114, 118.

In another embodiment, the channel 144 or the channel 148 is embodied as virtual channels in the network 114 or the network 118. That is, the data for transmission on the channel 144 or the channel 148 may be multiplexed with other data for transmission via the network 114 or the network 118. By using virtual channels, the need for separate network controllers or network cables for the network 114 and the network 118 may be obviated.

Example Architecture and Operations of Storage Switch

Figure 2:
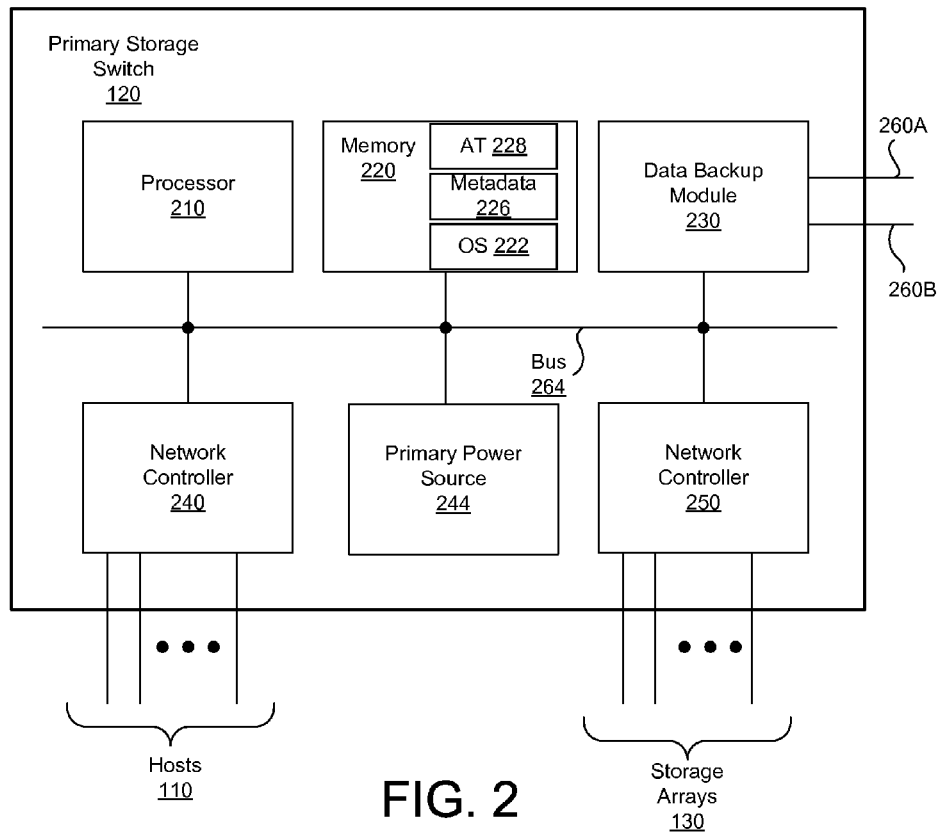
FIG. 2 is a block diagram illustrating a primary storage switch according to one embodiment.

FIG. 2 is a block diagram illustrating the primary storage switch 120 according to one embodiment. The primary storage switch 120 provides dynamic address translation for requests from the hosts 110 and responses from the storage arrays 130. Specifically, the primary storage switch 120 receives original read/write requests from the hosts 110, and in response, sends modified read/write requests to the storage arrays 130. The original requests identify the locations of the data using logical addresses whereas the modified requests identify the locations of the data using physical addresses. Further, the primary storage switch 120 receives original read/write responses (identifying the locations of the data using physical addresses) from the storage array 130, and in response, returns modified read/write responses (identifying the locations of the data using logical addresses) to the hosts 110.

The primary storage switch 120 may include, among other components, processor 210, memory 220, data backup module 230, network controller 240, primary power source 244 and network controller 250, and bus 264 connecting these components. The primary storage switch 120 may further include other components such as various chipsets, input modules and output modules that are not illustrated in FIG. 2.

The processor 210 executes instructions stored in the memory 220. Although only a single processor is illustrated in FIG. 2, two or more processors may be provided in the primary storage switch 120 to increase computing capability.

The memory 220 stores instructions and data for execution by the processor 210. The memory 220 stores various software modules for performing dynamic address translations. The software modules in the memory 220 may include, for example, operating system (OS) 222, metadata 226 and address translator (AT) 228. The OS 222 is executed by the memory 220 to manage resources in the primary storage switch 120. The OS 222 may be embodied, for example, as VMware operating system, RedHat operating system, CentOS operating system, Windows operating system, OpenSolaris operating system, Oracle Solaris, Citrix XenServer, and Linux operating system.

The AT 228 is a set of computer instructions modules executed by the processor 210 to convert addresses in original read/write requests and original read/write responses. Specifically, the AT 228 converts an original read/write request from the hosts 110 received via the network controller 250 into a modified read/write request sent to the storage array 130 via the network controller 250. Similarly, the AT 228 converts an original read/write response from the storage array 130 via the network controller 250 into a modified read/write response to the hosts 110 via the network controller 240.

The metadata 226 include, among others, a dynamic address translation table describing mapping between logical addresses and the physical addresses. When an original request or response is received, the AT 228 references the metadata 226 to identify a physical address or a logical address corresponding to an address included in the original request or response. Then, the AT 228 switches the physical address or the logical address of the original request with the corresponding logical address or the physical address indicated in the metadata 226. The metadata 226 also indicates the locations and the size of memory space available in the storage arrays 130. When original write requests are received from the hosts 110, the primary storage switch 120 allocates memory space in the storage arrays 130 to write data. Then, the metadata 226 are updated to indicate mapping of logical addresses and the physical addresses for the write requests. The mapping in the metadata 226 may also be updated after data in the storage array 130 are moved, deleted or added.

The data backup module 230 performs data backup operations to the secondary storage switch 124 by sending the metadata 226 to the secondary storage switch 124 via channel 260A. After receiving the metadata 226, the secondary storage switch 124 can deploy the metadata 226 in its memory to perform the dynamic address translation in lieu of the primary storage switch 120 when the primary storage switch 120 becomes inoperable. After the primary storage switch 120 becomes operational, the data backup module 230 may also receive the metadata 226 from the secondary storage switch 124 via channel 260B to resume the dynamic address translation operations. The components and the operations of the data backup module 230 are described below in detail with reference to FIG. 3.

The network controller 240 is hardware, firmware, software or a combination thereof for managing packet communication with the hosts 110. In one embodiment, the network controller 240 uses AoE protocol to receive original read/write requests from the hosts 110 and send modified read/write responses to the hosts 110.

The network controller 250 is hardware, firmware, software or a combination thereof for managing communication with the storage arrays 130. The network controller 250 may use, for example, AoE to communicate with the storage arrays 130. The network controller 250 sends modified read/write requests to the storage array 130 and receives original read/write responses from the storage array 130.

In one embodiment, the network controller 240 and the network controller 250 share at least one common component. As described above in detail with reference to FIG. 1, the network 114 and the network 118 may be interconnected. In such arrangement, a single network controller can function as both the network controller 240 and the network controller 250.

The bus 264 transmits data between the components of the primary storage switch 120. The primary storage switch 120 may include various chipsets or other circuit components for transmitting data via the bus 264.

The architecture of the primary storage switch 120 illustrated in FIG. 2 is merely illustrative. The primary storage switch 120 may consist of multiple physical structures dispersed in different devices, topological layers or areas of a network. Further, the primary storage switch 120 may be embodied in other network devices (e.g., routers or firewalls) capable of performing functions other than read/write operations on the SAN system.

In one embodiment, the secondary storage switch 124 has the same structure as the primary storage switch 120 illustrated in FIG. 2. The secondary storage switch 124 may have limited memory or computing capability compared to the secondary storage switch 124.

Example Architecture and Operation of Data Backup Module

Figure 3:
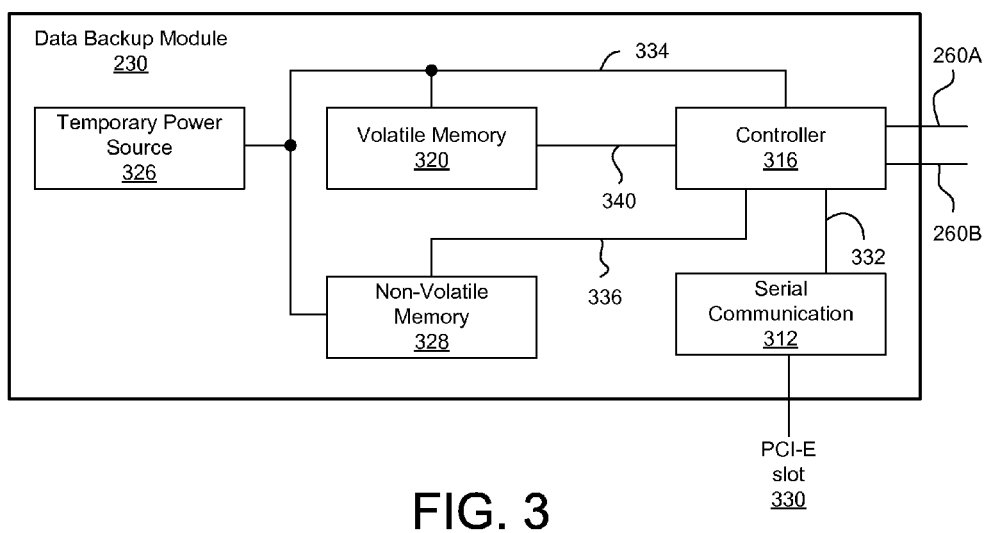
FIG. 3 is a block diagram illustrating a data backup module in the primary storage switch of FIG. 2, according to one embodiment.

FIG. 3 is a block diagram illustrating the data backup module 230, according to one embodiment. The data backup module 230 performs backup of the metadata 226 to the secondary storage switch 124 so that the secondary storage switch 124 can perform dynamic address translation in place of the primary storage switch 120. For this purpose, the data backup module 230 synchronizes the metadata 226 in the primary storage switch 120 and the secondary storage switch 124. In addition to the metadata 226, the data backup module 230 also synchronizes flushed write data. During power failure of the primary storage switch 120, the data backup module 230 is powered by a temporary power source to finalize synchronization of the metadata 226 with the secondary storage switch 124.

The data backup module 230 may include, among other components, serial communication module 312, controller 316, volatile memory 320, temporary power source 326 and non-volatile memory 320. The data backup module 230 may include components not illustrated in FIG. 3 such as an internal clock to track the time of synchronization. Further, the data backup module 230 may omit some components such as non-volatile memory 328 illustrated in FIG. 3. In one embodiment, the data backup module 230 is embodied as an expansion card that is installed in a PCI-E slot of the primary storage switch 120.

The temporary power source 326 provides power to the data backup module 230 temporarily during failure of power in the primary storage switch 120. The temporary power source 326 may be embodied as a supercapacitor, battery or a module for receiving Power over Ethernet (PoE). When using the PoE, the temporary power source 326 may be connected to one or more Ethernet cables capable of carrying power as well as implement data channels (e.g., 260A, 260B). During normal operation times of the primary storage switch 120, the data backup module 230 receives power via a card extension slot (e.g., PCI-E 330) of the primary storage switch 120. After detecting power failure in the bus 264, the controller 316 turns on the temporary power source 326 to provide temporary power 334 to the data backup module 230. The temporary power source 326 provides power 334 to the data backup module 230 sufficient to conclude synchronization of the metadata 226 in the secondary storage switch 124.

The volatile memory 320 stores the metadata 226 for backup operations. In one embodiment, the volatile memory 320 is constantly or periodically synchronized with the metadata 226 in the memory 220. Data in the memory 220 becomes unavailable when power failure occurs in the primary storage switch 120. During failure of power, the temporary power source maintains power to the volatile memory 320. While the temporary power source is available, the metadata 226 in the volatile memory 320 are sent to the secondary storage switch 124. In another embodiment, at least part of the memory 220 for storing the metadata 226 is embodied as the volatile memory 320 to obviate separate copying operations.

The serial communication module 312 interfaces with the bus 264. The serial communication module 312 may be embodied as PCI-E chipset for serially communicating via a PCI-E slot. In one embodiment, the serial communication module 312 sends updates 332 of the metadata 226 to the volatile memory 320 via the controller 316. A parallel communication module may be used to communicate with the bus 264 in place of the serial communication module 312.

The non-volatile memory 328 may be embodied, for example, as flash memory. In one embodiment, if communication to the secondary storage switch 124 is not available for some reason or the controller 316 determines that the temporary power is insufficient to persist until the backup operation to the secondary storage switch 124 is finished, the controller 316 stores the metadata 226 in the volatile memory 320 to the non-volatile memory 328 instead of sending the metadata 226 to the secondary storage switch 124. In another embodiment, the storing of metadata in the non-volatile memory 328 is performed in parallel with sending the metadata to the secondary storage switch 124. The non-volatile memory 328 stores the received metadata 226 and provides additional redundancy.

The controller 316 is hardware, software, hardware or a combination thereof for controlling the operations of the data backup module 230. The controller 316 may be embodied as an integrated circuit (IC) chip that includes a microprocessor and memory. During normal operational times, the controller 316 synchronizes the metadata 226 in the volatile memory 320 with the metadata 226 in the memory 220. In one embodiment, the controller 316 determines changes in the metadata stored in the volatile memory 320, and sends updates to the secondary storage switch 124.

The updating of the metadata 226 in the secondary storage switch 124 is performed periodically or intermittently during normal operations. When the main power fails in the primary storage switch 120, the data backup module 230 is placed in a backup mode. In the backup mode, the controller 316 determines any changes to the metadata in the volatile memory 320 that were not previously sent to the secondary storage switch 124 during the normal operation times, while being powered by the temporary power source 326. The controller 316 then sends the changes in the metadata 226 instead of sending the metadata 226 in its entirety. By sending only incremental changes to the metadata 226, the size of data transmitted, and more importantly, the time needed to update the metadata 226 in the secondary storage switch 124, can be reduced.

The metadata 226 as updated in the second storage switch 124 may be sent back to the primary storage switch 120 after the primary storage switch 120 becomes operational. Having performed the dynamic address translation operations at the secondary storage switch 124, the metadata in the secondary storage switch 124 may have undergone changes since the secondary storage switch 124 became inoperable. Hence, after the primary storage switch 120 becomes operational, the controller 316 receives the metadata 226 from the secondary storage switch 124 via channel 260B. The controller 316 then forwards the received metadata 226 to the memory 220 for deployment. After the metadata 226 are restored in the memory 220, the primary storage switch 120 resumes the dynamic address translation operations.

The architecture of data backup module 230 in FIG. 3 is merely illustrative. Various modifications to the data backup module 230 can be made to the data backup module 230 of FIG. 3. For example, the temporary power source 326 may power not only the data backup module 230 but other components such as the memory 220 to finish the backup operation. Also, the data backup module 230 may also include two or more sources of temporary power to provide additional redundancy in case of power failure.

Example Architecture and Operation of Storage Array

The architecture and the operations of storage arrays 130 are described herein using the examples of the storage array 130A (and occasionally the storage array 130B) to facilitate understanding. Each of the storage arrays in FIG. 1 may have the same or similar architecture and operate in the same or similar manner as the storage array 130A. Also, each of the storage arrays may be interchangeable with another storage array. For example, a drive in the storage array may be switched to another storage array to perform the same function as long as the metadata 226 in the primary storage switch 120 is updated to map the physical addresses to the correct storage array.

The storage array 130A may perform, among others functions, read and write operations pursuant to modified read/write requests received from the primary storage switch 120. The storage array 130A also performs backup of data in write cache to another storage array (e.g., the storage array 130B) so that the operation of the storage array 130A can be resumed quickly with a reduced number of manual operations.

Figure 4:
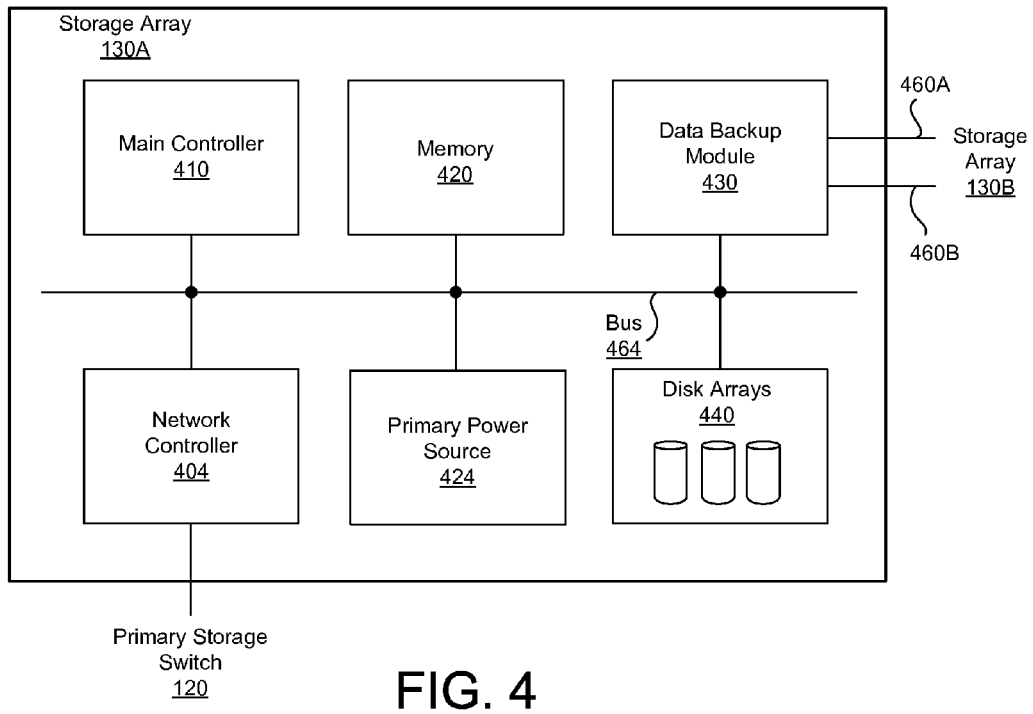
FIG. 4 is a block diagram illustrating a storage array according to one embodiment.

FIG. 4 is a block diagram illustrating the storage array 130A according to one embodiment. The storage array 130A may include, among other components, network controller 404, main controller 410, memory 420, primary power source 424, data backup module 430, disk arrays 440 and bus 464 connecting these components.

The main controller 410 reads and executes instructions stored in the memory 420. The main controller 410 may be embodied as a microprocessor.

The primary power source 424 provides power to various components of the storage array 130A. In one embodiment, the primary power source 424 is a direct current (DC) regulator connected to an external alternating current (AC) outlet.

The network controller 404 is hardware, software, firmware or a combination thereof for communicating with the primary storage switch 120 via the network 118. Specifically, the network controller 404 receives modified read/write requests and sends original read/write responses via the network controller 250, as described above in detail with reference to FIG. 5.

The disk arrays 440 store a large amount of data. In one embodiment, the disk arrays 440 are off-the-shelf Solid State Drives (SSD), Serial attached SCSIs (SAS), Serial ATA (SATA) disks or a combination thereof. The storage array 130A includes multiple bays (e.g., 24 bays or 36 bays) for holding corresponding number of drives or disks. Typically, the disk arrays 440 stores data in the range of tens or hundreds of terabytes or more.

The memory 420 is volatile memory for storing data, among others, cached data for reading or writing operations. The memory 420 temporarily caches data for writing to the disk arrays 440 or data for reading from the disk arrays 440. The cached data are then written to the disk arrays 440 (for writing operation) or sent to the primary storage switch 120 via the network controller 404 (for reading operation). In one embodiment, the storage array 130A acknowledges writing of data from the primary storage switch 120 after the data is temporarily stored in the memory 420 instead of waiting until the data is moved onto the disk arrays 440. By caching the write data on the memory 420 with a higher access speed compared to the disk arrays 440, the write operations are advantageously performed at a correspondingly higher speed from the perspective of the hosts 110 or the primary storage switch 120.

Although caching write data advantageously speeds up the writing operations, the caching operation may also cause discrepancy in data actually stored in the disk arrays 440 and data indicated in the hosts 110 and the primary storage switch 120 as being stored in the disk arrays 440. That is, if power failure occurs in the storage array 130A while cached write data remain in the memory 420, the cached data in the memory 420 may be wiped out before being moved onto the disk arrays 440. However, the storage array 130A may have already acknowledged writing of data in the storage array 130. Hence, the metadata 226 or other records in the hosts 110 and the primary storage switch 120 would indicate that the write data are safely stored in the disk arrays 440 despite the fact that the write data were actually wiped out from the primary storage switch 120A due to the power failure.

Hence, to resolve or prevent such discrepancy in the stored data, the data backup module 430 performs backup of any cached write data to another storage array (e.g., the storage array 130B). The data backup module 430 is hardware, firmware, software or a combination thereof for storing cached write data in the storage array 130B and may include the same components as the data backup module 230, as described above in detail with reference to FIG. 3, except that the volatile memory stores cached write data instead of metadata 226. In other words, the volatile memory in the data backup module 430 of the storage array 130A is synchronized with the cached write data in the memory 420 instead of the metadata 226.

The memory 420 may also store an operating system (not shown) that allows parallel processing of a large number of read/write operations. For example, an operating system such as CorOS available from Coraid Inc. of Redwood City, Calif. is stored in the memory 420.

The storage array 130A may experience failure in its primary power source 424 that affects all or most of its components. In such case, the backup operations are similar to the backup operations for the primary storage switch 120. That is, all the storage disks or drives in the disk arrays 440 are moved to a backup storage array (e.g., the storage array 130B). Any cached write data remaining in the data backup module 430 are also transmitted to the backup storage array before or after physically moving the disks or drives from the failed storage array 130A to the backup storage array. The backup storage array may then be placed online to service the read/write requests in place of the failed storage array 130A.

On the other hand, the storage array 130A may experience power outage in a subset of bays that affects some of the disks or drives in the disk arrays 440. In this case, only the disks or drives experiencing power outage may be physically removed from the storage array 130A and reinstalled in the storage array 130B. Also, the cached write data corresponding to the disks or drives being moved to the storage array 130B may be sent selectively to the storage array 130B. The storage array 130B can then resumes write or read operations on the newly installed disks or drives.

The cached write data may be moved from the data backup module 430 to the storage array before or after the drives or disks in the disk arrays 440 are reinstalled in the storage array 130B. As long as the bay in the storage array 130B to hold the reinstalled drive is designated, the cached write data for the drive to be reinstalled can be stored before or after the drive is reinstalled in the storage array 130B.

The data backup module 430 is also connected to the channel 460B for receiving the cached write data from the storage array 130B. When the storage array 130B experiences power failure, the storage array 130A can also function as a backup storage array for the storage array 130B. In this case, the data backup module 430 receives cached write data via the channel 460B and sends the cached write data to the memory 420. The disks or drives from the storage array 130B can be installed in the disk arrays 440.

Process of Performing Backup Operation

Figure 5:
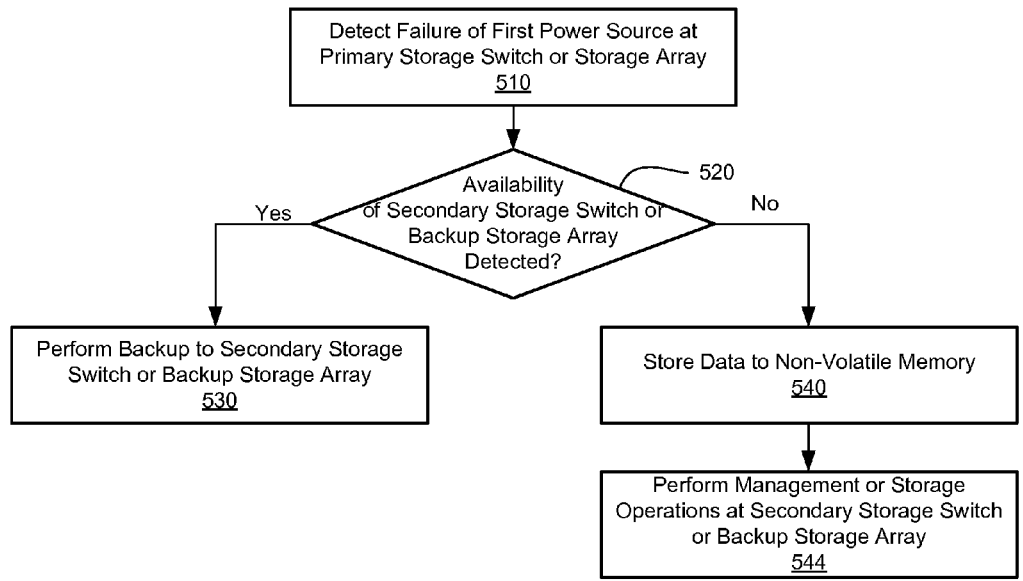
FIG. 5 is a flowchart illustrating the operations of the system of FIG. 1 after failure of the primary storage switch or a storage array, according to one embodiment.

FIG. 5 is a flowchart illustrating a method of performing a backup operation of metadata 226 or cached write data, according to one embodiment. First, the data backup module 230 or the data backup module 430 detects 510 the failure of the first power source at the primary storage switch 120 or the storage array 130A. The first power source may be the main power supply at the primary storage switch 120 or the storage array 130A that is provided via main power supply lines.

Then the data backup module 230 or the data backup module 430 determines 520 whether the secondary storage switch 124 or backup storage array (e.g., the storage array 130B) is available 520 to receive the metadata 226 or cached write data.

If the secondary storage switch 124 or the backup storage array is available, the backup of metadata or the cached write data to the secondary storage switch 124 or the backup storage array is performed 530, as described below in detail with reference to FIGS. 6 and 7. The secondary storage switch 124 or the backup storage array 130B can resume and replace the operation of the primary storage switch 120 or the storage array 130A without losing any data.

If it is determined 520 that the secondary storage switch 124 or the backup storage array 130B is not available for backup operation, the metadata 226 or the cached write data are stored 540 in the non-volatile memory of the data backup module 230 or the data backup module 430. The secondary storage switch 124 or the backup storage array 130B then performs 544 dynamic address translation service or perform the storage operation without the updated metadata or the cached write data. Alternatively, the data stored in the non-volatile memory may be retrieved manually from the primary storage switch 120 or the storage array 130A. Then the data in the non-volatile memory may be copied onto the secondary storage switch 124 or the backup storage array 130B before continuing dynamic translation service or storage operations.

The steps and sequences as illustrated in FIG. 5 are merely illustrative. For example, step 540 may be performed in parallel with step 530 regardless of whether the secondary storage switch 124 or the backup storage array 130B is available.

Figure 6:
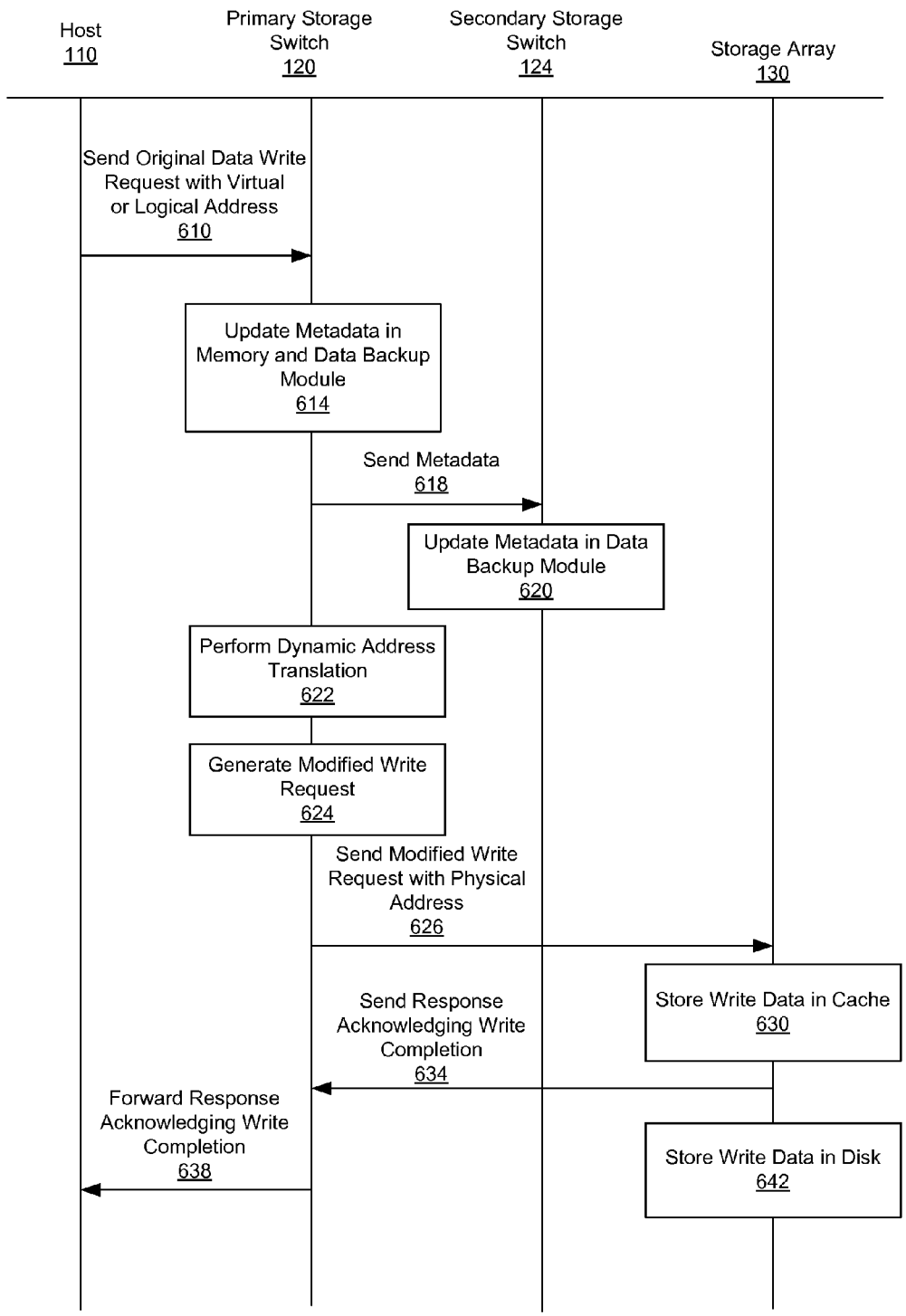
FIG. 6 is an interaction diagram illustrating interactions between components of FIG. 1 during a normal operation, according to one embodiment.

FIG. 6 is an interaction diagram illustrating interactions between components of the SAN system during a normal write operation, according to one embodiment. First, the host 110 sends 610 an original data write request to the primary storage switch 120. The original data write request identifies the location of the data using logical addresses. The primary storage switch 120 updates 614 the metadata 226 in the memory 220 and the volatile memory 320 according to logical addresses and corresponding physical addresses for the write data. The primary storage switch 120 also sends 618 updates of the metadata to the secondary storage switch 124 for backup. The secondary storage switch 124 updates 620 the metadata in its data backup module after receiving the updates of the metadata. The secondary storage switch 124 may also deploy the updated metadata in its memory to prepare for operations in case the primary storage switch 120 becomes inoperable.

The primary storage switch 124 also performs 622 dynamic address translation based on the metadata 226. The secondary storage switch 124 then generates 624 a modified write request based on the dynamic address translation. The primary storage switch 120 then sends 626 the modified write request identifying the location of the data by a physical address.

The storage array 130 receives the modified write request and stores 630 the write data in the memory 420 for caching. After caching the data, the storage array 130 sends 634 a response acknowledging completion of the write operation to the primary storage switch 120. The storage array 130 also stores 642 the data cached in the memory 420 to the disk arrays 440. After the primary storage switch 120 receives the response, the primary storage switch 120 forwards the response to the host 110.

Figure 7:
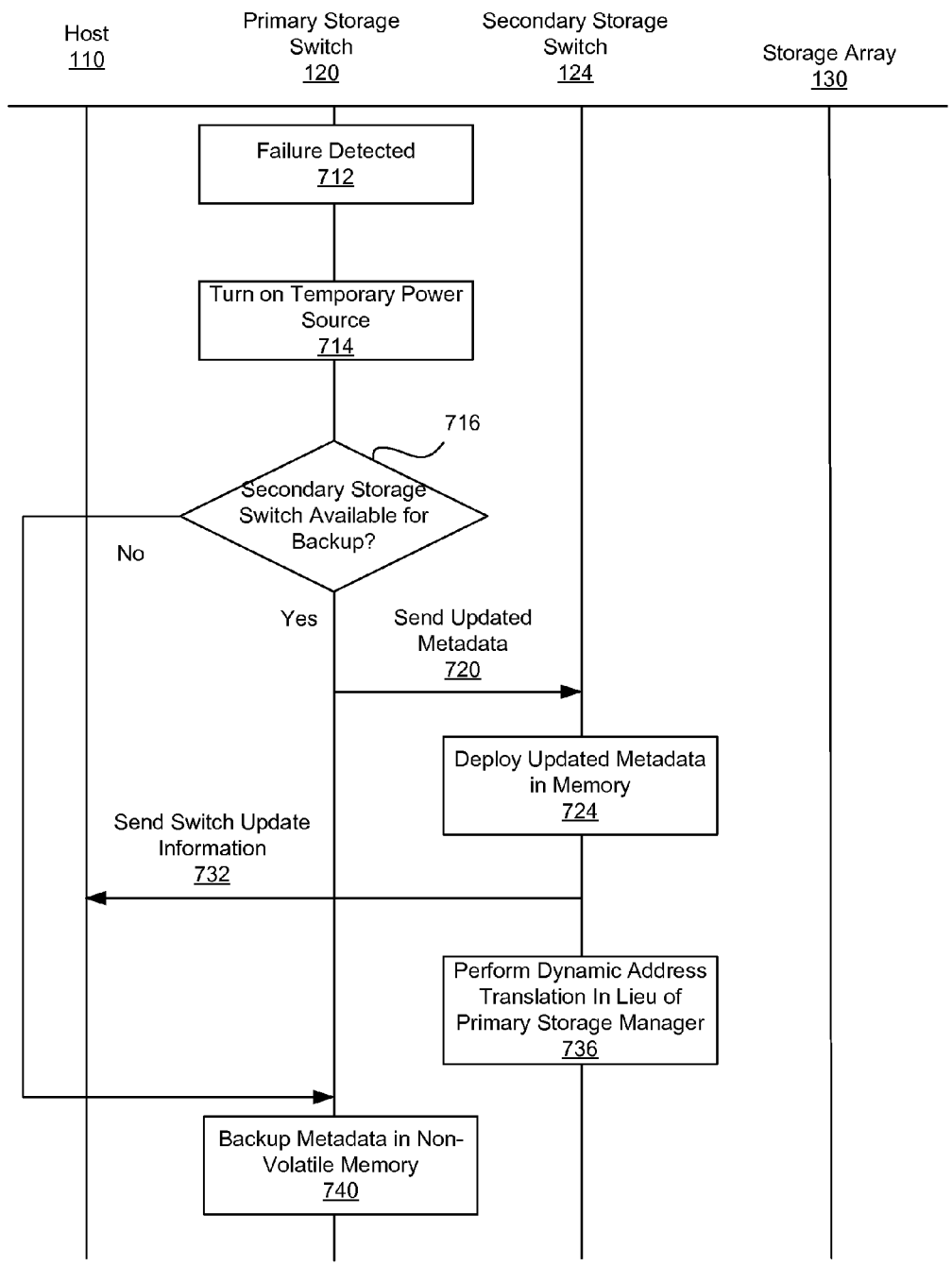
FIG. 7 is an interaction diagram illustrating interactions between components of FIG. 1 after failure of a primary storage switch, according to one embodiment.

FIG. 7 is an interaction diagram illustrating interactions between components of the SAN system after failure of the primary storage switch 120, according to one embodiment. When the power failure of the primary storage switch 120 is detected 712 at its data backup module 230, the temporary power source 326 is turned on 714 to power the data backup module 230. Then the data backup module 230 determines if the secondary storage switch 124 is available for backup operation. If the secondary storage switch 124 is available, then the secondary storage switch 124 sends 720 any updates in the metadata 226 to the secondary storage switch 124. The secondary storage switch 124 then deploys 724 the received metadata 226 in the memory of the secondary storage switch 124.

The secondary storage switch 124 also sends 732 switch update information to the hosts 110 indicating that read/write requests should be sent to the secondary storage switch 124 instead of the primary storage switch 120. The switch update information indicates the network address and other information that allows the hosts 110 to send the read/write requests to the secondary storage switch 124. The secondary storage switch 124 receives read/write requests from the hosts 110, and performs 736 dynamic address translation in lieu of the secondary storage switch 124. The subsequent operations are substantially identical to the primary storage switch 120 in FIG. 6 except that the metadata is backed up in another storage switch or a non-volatile memory in the data backup module 230.

If it is determined in step 716 that the secondary storage switch 124 is not available for some reason (e.g., the secondary storage switch 124 is also experiencing power outage), then the metadata 226 are backed up 740 in the non-volatile memory 328 of the data backup module 230 instead of sending the metadata 226 to the secondary storage switch 124.

Figure 8:
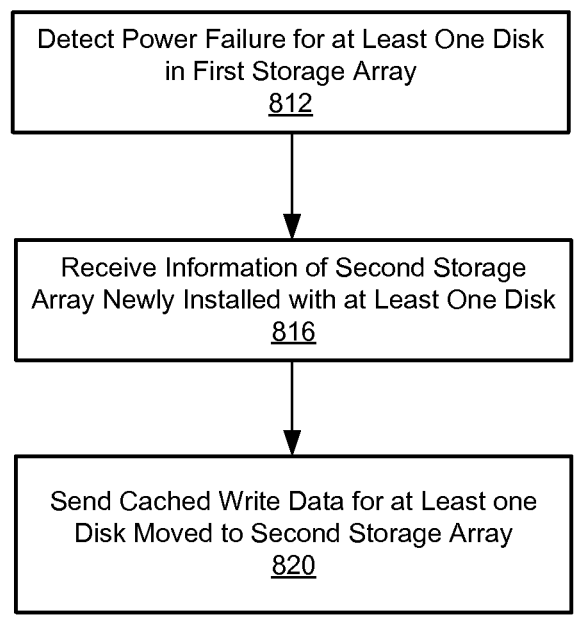
FIG. 8 is a flowchart illustrating operations after failure in a storage array, according to one embodiment.

FIG. 8 is a flowchart illustrating operations of the SAN system after power failure in at least one disk drive of the storage array 130A, according to one embodiment. The power failure in at least one disk of the storage array 130A is detected 812 at the primary storage switch 120. In response, the primary storage switch 120 holds off or denies read/write requests associated with the disk experiencing power failure in the storage array 130A.

If the operation of the disk can be resumed by reinstalling the disk to the storage array 130B, the disk is manually removed from the storage array 130A and installed on the storage array 130B. The information about the storage array 130B newly installed with the disk or to be newly installed with the disk is then received 816 at the primary storage switch 120. The primary storage switch 120 then updates the metadata associated with the dynamic address translation accordingly.

The storage array 130A then sends 820 cached write data for the removed disk to the storage array 130B newly installed with the disk. Using the cached write data, the storage array 130B can finish the write operations unfinished in the storage array 130A and prepare for new read/write requests from the primary storage switch 120.

Although embodiments are described herein with reference to the SAN system, the same principle can be applied to other storage systems communicating over networks. The same principle may apply, for example, to network-attached storage (NAS) system. In such systems, data similar to metadata or cached write data or other operational data for the storage systems may be backed up and deployed to replace a failed device.

Upon reading this disclosure, those of ordinary skill in the art will appreciate still additional alternative structural and functional designs through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for managing access by a host device to at least one storage device over a network by a storage switch, comprising:
   receiving a first request from the host device to read data from or write data to the at least one storage device over a network, the first request identifying a location of the data by a logical address;
   converting the logical address in the first request into a physical address by referencing mapping information;
   sending a second request to the at least one storage device identifying location of data by the physical address over the network;
   storing the mapping information in a data backup module; and
   responsive to detecting failure of a first power source:
      operate the data backup module using a second power source separate from the first power source; and
      sending the mapping information in the data backup module to another storage switch for managing access by the host device to the at least one storage device in place of the storage switch.

2. The method of claim 1, wherein the first request is communicated over the network using AT Attachment over Ethernet (AoE) protocol.

3. The method of claim 1, the mapping information is sent to the other storage switch via a communication channel separate from the network.

4. The method of claim 3, wherein the second power source comprises a cable implementing the communication channel to the other storage switch.

5. The method of claim 1, wherein the data backup module is implemented as an expansion card mounted in a slot of the storage switch.

6. The method of claim 1, further comprising:
   sending updates in the mapping information to the other storage switch periodically before detecting the failure of the first power source; and
   responsive to detecting the failure of the first power source, sending incremental changes in the mapping information since previous transmission of the updates.

7. The method of claim 1, wherein the storage switch and the at least one storage device implement a Storage Area Network (SAN).

8. The method of claim 1, wherein the second power source comprises one of a battery, a supercapacitor and a module for receiving Power over Ethernet (PoE).

9. The method of claim 1, further comprising storing the mapping information in a non-volatile memory of the data backup module, responsive to detecting the failure of the first power source.

10. A storage switch for managing access by a host device to at least one storage device over a network, the storage switch comprising:
   a network controller configured to:
      receive, over a network, a first request from the host device to read data from or write data to the at least one storage device, the first request identifying a location of the data by a logical address;
      send, over the network, a second request to the at least one storage device identifying location of data by a physical address;
   an address translator coupled to the network controller, the address translator configured to perform conversion of the logical address to the physical address by referencing mapping information; and
   a data backup module configured to send the mapping information to another storage switch for managing access by the host device to the at least one storage device in place of the storage switch responsive to detecting failure of a first power source in the storage switch, the data backup module powered by a second power source responsive to detecting the failure of the first power source.

11. The storage switch of claim 10, wherein the at least one network controller communicates with the host device using AT Attachment over Ethernet (AoE) protocol.

12. The storage switch of claim 10, wherein the data backup module sends the mapping information to the other storage switch via a communication channel separate from the network.

13. The storage switch of claim 12, wherein the second power source comprises a cable implementing the communication channel to the other storage switch.

14. The storage switch of claim 10, wherein the data backup module is implemented as an expansion card mounted on a slot of the storage switch.

15. The storage switch of claim 10, wherein the data backup module is configured to:
send updates in the mapping information to the other storage switch periodically before detecting the failure of the first power source; and
send incremental changes in the mapping information since previous transmission of updates responsive to detecting the failure of the first power source.

16. The storage switch of claim 10, wherein the storage switch and the at least one storage device implement a Storage Area Network (SAN).

17. The storage switch of claim 10, wherein the second power source comprises one of a battery, a supercapacitor and a module for receiving Power over Ethernet (PoE).

18. The storage switch of claim 10, wherein the data backup module comprises a non-volatile memory for storing the mapping information responsive to the failure of the first power source and detecting unavailability of the other storage switch to receive the mapping information.

19. A storage device for receiving write requests over a network, comprising:
a network controller configured to communicate, via a network, with a storage switch performing conversion of a logical address identified by a host device into a physical address for identifying a location of data in the storage device;
a volatile memory module configured to cache data for storing in the storage device, the cached data received from the storage switch;
a plurality of non-volatile storage modules configured to receive and store the cached data in the volatile memory; and
a data backup module configured to send, to another storage module, the cached data associated with one or more of the plurality of non-volatile storage modules experiencing failure in the storage device, the other storage module installed or to be installed with the one or more of the plurality of non-volatile storage module to resume operation of the one or more of the plurality of non-volatile storage modules, wherein the data backup module is powered by a first power source and is powered by a second power source that receives power over Ethernet responsive to detecting failure of the first power source.

20. The storage device of claim 19, wherein the plurality of non-volatile storage modules are powered by the first power source.

21. The storage device of claim 19, wherein the data backup module is configured to send the cached data to the other storage device via a communication channel separate from the network.

22. The storage device of claim 19, wherein the data backup module is implemented as an expansion card mounted in a slot of the storage device.

23. The storage device of claim 19, wherein the storage switch and the storage device implement a Storage Area Network (SAN).

24. The storage device of claim 19, wherein the data backup module comprises a non-volatile memory for storing the cached data responsive to detecting the failure of a first power source and detecting unavailability of the other storage device to receive the cached data.

25. A method of processing write requests received over a network at a storage device, comprising:
receiving a write request from a storage switch over a network, the storage switch performing conversion of a logical address identified by a host device into a physical address for identifying a location of data in a storage device;
caching data in the write request in a volatile memory;
storing the cached data in the volatile memory in a plurality of non-volatile storage modules; and
responsive to detecting failure of a first power source in one or more of the plurality of non-volatile storage modules:
receiving power over Ethernet to power the one or more plurality of non-volatile storage modules; and
sending the cached data associated with the one or more of the plurality of the non-volatile storage modules to another storage device installed or to be installed with the one or more of the plurality of non-volatile storage modules to resume operation of the one or more of the plurality of non-volatile storage modules.

26. The method of claim 25, wherein the cached data is sent to the other storage device via a communication channel separate from the network.

27. The method of claim 25, further comprising storing the cached data in a non-volatile memory responsive to detecting the failure of the first power source and detecting unavailability of the other storage device to receive the cached data.

28. A data backup module in a device of a storage area network, comprising:
an interface module configured to receive data for operating the device, the interface connected to a first power source of the device to provide power to the data backup module;
a volatile memory for storing the data received via the interface module;
a controller for sending the data in the volatile memory to another device of the storage area network;
a second power source connected to the volatile memory and the controller to power the volatile memory and the controller responsive to detecting the failure of the power from the first power source; and
a non-volatile memory for storing the data in the volatile memory responsive to detecting the failure of the first power source and unavailability of the another device to receive the data.

* * * * *